United States Patent [19]

Van Schyndel

[11] Patent Number: 5,473,683
[45] Date of Patent: Dec. 5, 1995

[54] POST ASSEMBLY PROCESS FOR ADJUSTING THE GAIN OF AN ELECTRET MICROPHONE WITHIN A COMMUNICATIONS APPARATUS

[75] Inventor: Andre J. Van Schyndel, Kanata, Canada

[73] Assignee: Northern Telecom Limited, Montreal, Canada

[21] Appl. No.: 984,726

[22] Filed: Dec. 4, 1992

Related U.S. Application Data

[63] Continuation-in-part of Ser. No. 834,743, Feb. 13, 1992, abandoned.

[51] Int. Cl.$^6$ ..................................................... H04M 1/24
[52] U.S. Cl. .......................... 379/387; 379/1; 379/419; 379/444; 381/191; 381/113
[58] Field of Search ............................ 381/173, 174, 381/191, 113, 155, 111; 307/400; 379/387, 388, 395, 419, 420, 1, 444; 250/252.1, 336.1, 389; 29/592.1

[56] References Cited

U.S. PATENT DOCUMENTS

| | | | |
|---|---|---|---|
| 3,612,778 | 10/1971 | Murphy | 381/191 |
| 3,663,768 | 5/1972 | Madsen et al. | 381/174 |
| 3,711,941 | 1/1973 | Sessler et al. | 29/592.1 |
| 4,082,951 | 4/1978 | Moran . | |
| 4,227,086 | 10/1980 | Dreybus et al. . | |
| 4,246,448 | 1/1981 | Tam et al. | 381/111 |
| 4,385,209 | 5/1983 | Greason et al. | 381/173 |
| 4,401,891 | 8/1983 | Lewiner et al. . | |
| 4,429,191 | 1/1984 | Busch-Vishniac et al. | 381/155 |
| 4,434,327 | 2/1984 | Busch-Vishniac et al. | 581/155 |
| 4,853,536 | 8/1989 | Dempsey et al. . | |

OTHER PUBLICATIONS

"The Effect of Irradiation of the Electret Depolarization of Polymethyl Methacrylate" by Kh. Solunov and P. Hedvig, in vol. 1, pp. 899–906 of the 1972 Published Proceedings of the Tihany Symposium on Radiation Chemistry.

*Primary Examiner*—Jeffery A. Hofsass
*Assistant Examiner*—Scott Wolinsky
*Attorney, Agent, or Firm*—J. E. Moorhouse

[57] ABSTRACT

A post assembly process for enabling a manufacturer of acoustical communications apparatus, such as telephones and the like, to conveniently trim a sensitivity characteristic of an electret microphone therein, after assembly of the apparatus, whereby a uniform performance standard may be adhered to. When the acoustical sensitivity characteristic of the electret transducer is measured to be greater than a predetermined value, the transducer is exposed to X-ray radiation until the measured sensitivity characteristic has been reduced to the predetermined value.

8 Claims, 3 Drawing Sheets

POST ASSEMBLY PROCESS FOR ADJUSTING THE GAIN OF AN ELECTRET MICROPHONE WITHIN A COMMUNICATIONS APPARATUS

This application is a continuation-in-part, of application Ser. No. 07/834,743, filed Feb. 13, 1992, now abandoned.

The present invention is in the field of electret transducers and relates to achieving a predetermined acoustical sensitivity across a population of electret microphones. The invention also relates to the provision of acoustical communications apparatus, such as telephones, recorders, and the like, with electret microphones having improved uniformity of acoustical sensitivity characteristics.

BACKGROUND OF THE INVENTION

Various transducers are characterized by a structure specialized for the purpose of transforming acoustical energy into electrical energy. Such transducers are generally referred to as microphones. A designer of electronic audio apparatus may select from various types of microphones to optimize performance on the basis of one or more comparative performance characteristics, such as bandwidth, sensitivity, and linearity. Over the last decade or so, microphones of the so-called capacitance type, including a charged electret membrane, have become the transducer of choice, because of comparatively acceptable performance characteristics and low cost. In an electronic audio apparatus such as a telephone set, there is included a transmitter circuit, whereby signals representative of a user's voice may be transmitted from the telephone set by way of an associated telephone line. In the telephony industry the use of electret microphones in the transmitter circuits of telephone handsets and telephone hands free units, is now almost universal. In the transmitter circuit the electret microphone provides conversion of the user's voice to an electrical signal which is further amplified or processed in preparation for transmittal.

One of the most important aspects in the operation of any telephony system is strict adherence to standards of performance. For example, the standard for gain within the telephone transmission circuit is often specified to a predetermined level about which no more than a decibel or so of variation is preferred. In the manufacture of low cost electret microphones, one of the difficult parameters of performance to control is that of the sensitivity of the microphone to acoustical energy. Furthermore in the manufacture of telephony apparatus more than a decibel of unintended signal variation may be introduced in the transmitter circuit, by any of heat, shock or vibrational stresses, which typically occur during assembly operations. Hence one of several performance parameters, for which each telephone set is tested before it is delivered to a customer, is that of conformance to a transmission gain standard, as specified for the telephone system in which the telephone is intended to operate. In order to optimize the successful manufacture of electret microphone telephone sets, prior to assembly, electret microphones are tested to select only those which are within a narrow predetermined range of sensitivity, for subsequent assembly in the apparatus. Those electret microphones falling outside of the range are unsuitable and may be returned to the supplier or simply discarded. Hence it can be seen that if the stresses of the assembly process are somewhat variable, the acceptable range of sensitivity must be so narrow that the cost of acceptable electret microphones will rise. On the other hand, various changes directed toward reducing the variances of stresses in the already optimized assembly process might be experimented with. However such experiment comes with attendant risk and cost.

A manufacturer of telephony equipment intending to supply international markets is faced with at least several significantly dissimilar transmission performance standards. These variations in requirements may be met by component value modifications, which of course add to the overall cost of manufacture. In some instances the international manufacturer may find modifications intended for conformance to a foreign national standard to be of a cost which is prohibitive, and so will not compete with a foreign national manufacturer.

It is an object of the invention to enable the manufacturer of electronic apparatus, such as recorders, telephones and the like, to conveniently trim a sensitivity characteristic of an electret transducer, either post-assembly of the transducer, or post-assembly of the electronic apparatus which contains the transducer, whereby a uniform performance standard may be adhered to.

SUMMARY OF THE INVENTION

The invention is a process for trimming an acoustical sensitivity characteristic of a transducer having an electret membrane which has been electrically polarized, the process comprising the steps of:

a) determining the acoustical sensitivity characteristic of the electret transducer to be of a greater value than a predetermined value; and b) exposing the transducer to ionizing radiation sufficient to reduce the polarization of the electret membrane.

In one example, the process is applied, post-assembly, to the manufacture of telephone terminal apparatus, each such apparatus including a transmit circuit having an electret microphone. The post-assembly process is performed in a processing environment wherein individual ones of the assembled telephone terminal apparatus may be connected for operation to a telephone line, and may be exposed to a source of sound and to a source of ionizing radiation, the process comprising the steps of:

a) energizing an individual one of the telephone terminal apparatus, in an OFF HOOK condition, via the telephone line;

b) operating the source of sound to generate a predetermined sound pressure level of a predetermined frequency within an operating voice band of the transmit circuit;

c) via the telephone line, determining sound amplitude in signals being representative of signals from the electret microphone, d) comparing the amplitude determined in step c) with a value being representative of a predetermined minimum amplitude and in a case where the amplitude determined in step c) is in excess of said value, e) operating the source of radiation to radiate at least a portion of the telephone terminal apparatus containing the electret microphone, until the sound amplitude is similar to the predetermined minimum amplitude, whereby the gain characteristic of the apparatus is adjusted.

For some electret microphone designs, it has been found advantageous to perform the trimming process with X-ray radiation in an environment wherein the microphone is maintained at a temperature elevated above normal room temperature.

After the telephone terminal apparatus has been processed to adjust its transmit gain characteristic, it is removed from the processing environment and packaged for shipment to a user. If on the other hand the amplitude of the signals from the microphone is insufficient to be at least similar to the predetermined minimum amplitude, the apparatus is set aside for possible remanufacture or disposal.

INTRODUCTION OF THE DRAWINGS

An example of a process and an article of manufacture are discussed with reference to the accompanying drawings in which.

DESCRIPTION

Figure 1:
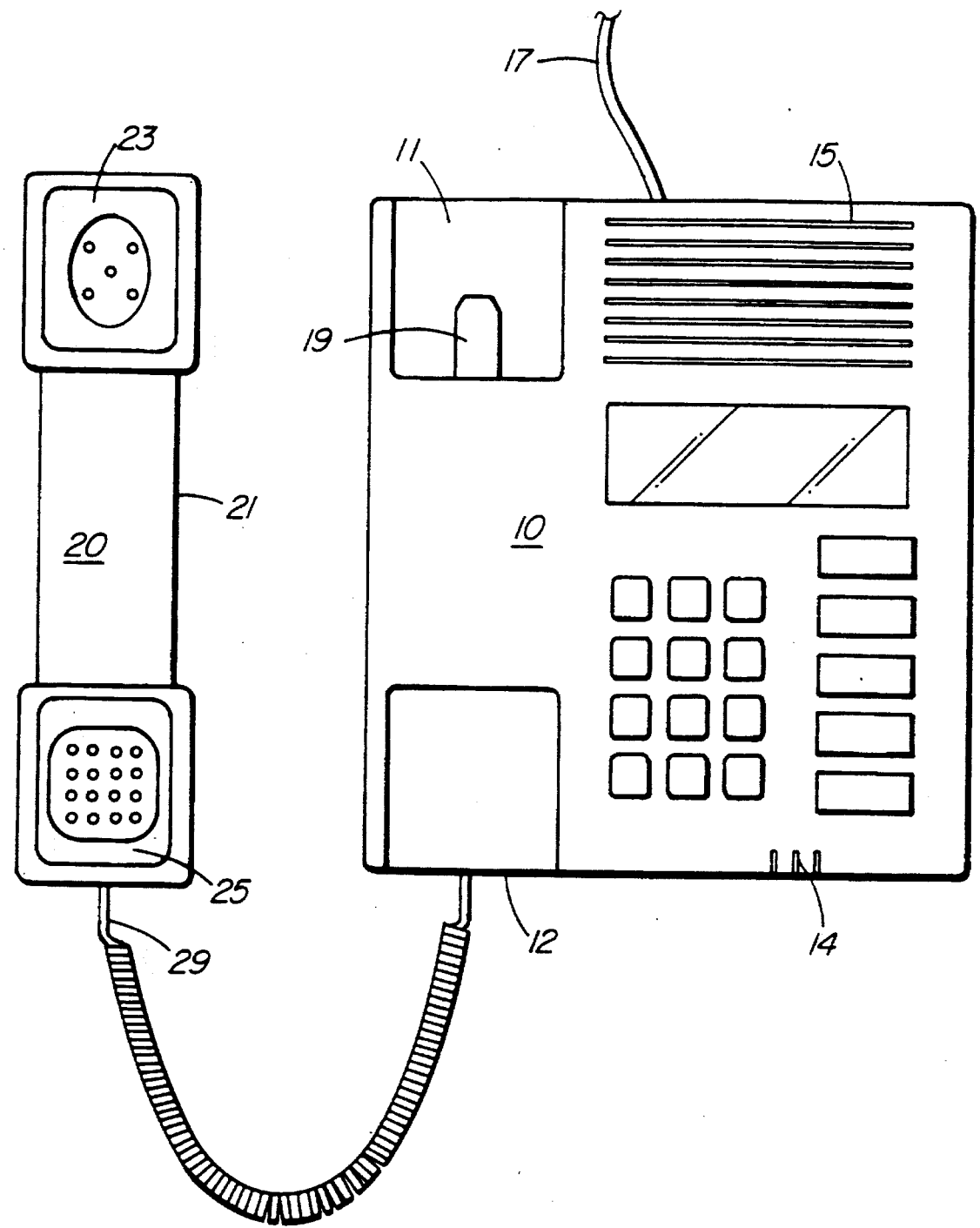
FIG. 1 is a diagram of a telephone station set wherein manufacture of same in accordance with the invention is of benefit.

The telephone station set in FIG. 1 is representative of a production population of telephone sets. The telephone station set includes a base portion 10, having handset receiver and handset transmitter depressions 11 and 12, wherein receiver and transmitter portions 23 and 25 of a handset 20 are lodged, while the handset is positioned to cause the telephone station set to be in an ON HOOK state. As illustrated, the telephone station set is in an OFF HOOK state, as may be the case if it were in normal use. The base portion 10 contains elements, not shown but well known in the telephony arts, for its function as a telecommunications terminal. These elements typically include a hybrid circuit for coupling transmit and receive analog signals with a telephone line 17, or alternatively a codec and an interface circuit for coupling pulse code modulated (PCM) signals with the telephone line 17. In this example the telephone base portion 10 also includes a hands free unit which includes a transmitter portion having a microphone, not visible, being fixed adjacent a microphone port 14, and a receiver portion having a loud speaker being retained beneath a speaker grill 15. The handset 20 includes a handle portion 21 which extends between the receiver and transmitter portions 23 and 25. Elements of the receiver and transmitter portions 23 and 25 are electrically connected to appropriate elements within the base 10 by way of a telephone cord 29.

Figure 2:
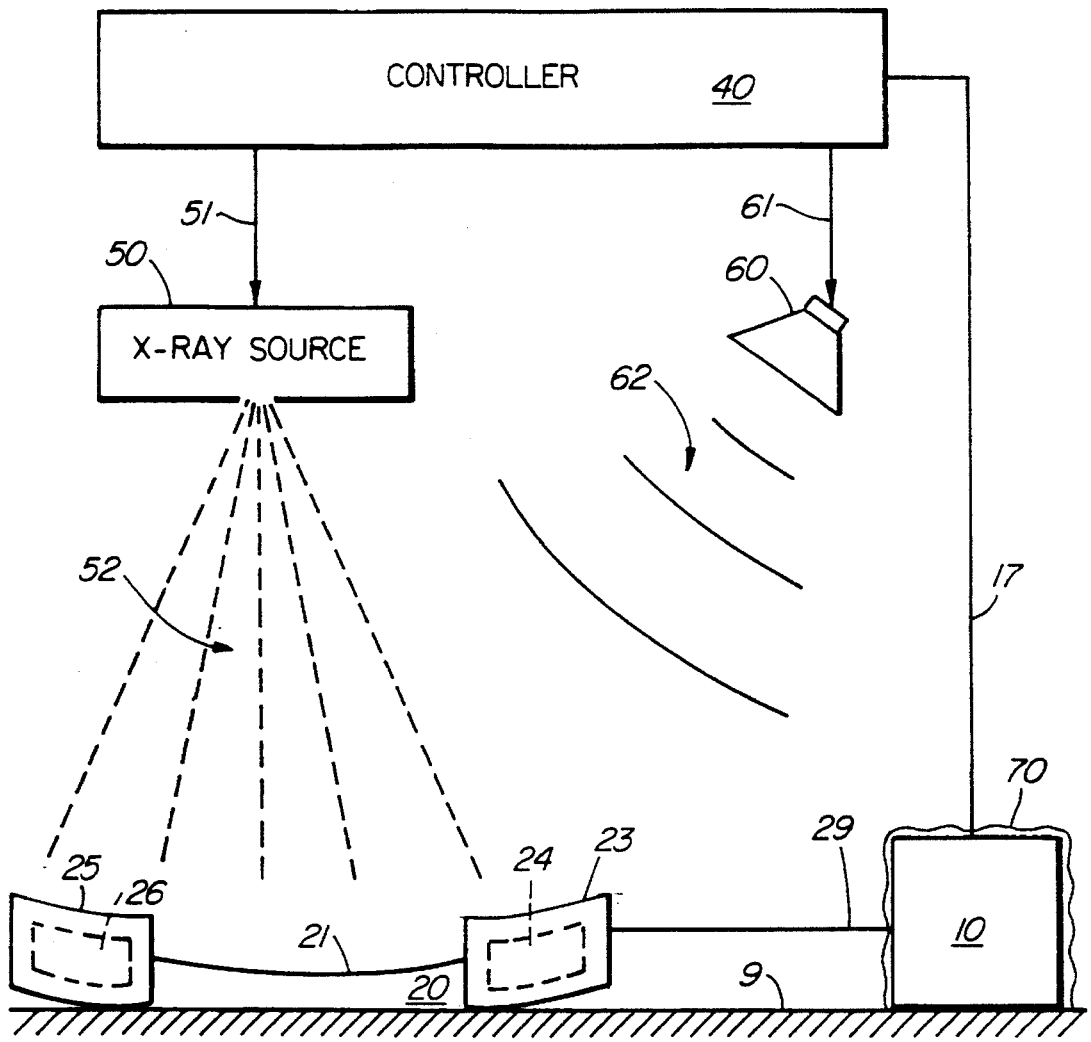
FIG. 2 is block schematic diagram of apparatus for applying a process in accordance with the invention to an article of manufacture as exemplified in FIG. 1.

Recently the comparatively lower costs of electret transducers have virtually dictated that the microphone elements, within the present day mass-produced telephone set, be of the electret structure. This is in spite of the attendant expense of ensuring acceptably uniform transmission characteristics as herein before mentioned. FIG. 2 illustrates apparatus which is operable to apply an advantageously economical process by which the gain characteristics of an electroacoustic product may be trimmed to a predetermined standard. The process is applicable at any convenient moment in the production assembly process. However it is believed that the most beneficial result of the process is usually achieved when the process is performed post-assembly, that is, after the assembly process has been completed. A possible exception to this is in the case of some types of electret microphones which may require further processing for example at an elevated temperature to reduce an inconvenient side effect of the radiation. As the process is essentially a trimming or gain reduction process, the electret microphone must have a greater gain characteristic than that specified for the finished product, prior to the application of the process.

Referring to FIG. 2, the telephone set of FIG. 1, being in a processing environment, is shown to rest upon a supporting surface 9, in the OFF HOOK state, and the handset 20 is positioned relative to the processing apparatus such that controlled exposure to X-ray radiation may be achieved. As the base 10 of the telephone set also includes an electret microphone, not shown, in FIG. 2 adjacent the port 14, the base 10 is covered with a blanket 70 of shielding material, such as lead, so that the gain of this microphone will not be affected by the process of adjusting the gain of the microphone 26. The processing apparatus includes an X-ray source 50 being capable of emitting ionizing radiation, depicted at 52. The ionizing raditation must be of sufficient energy to penetrate the structure of the transmitter portion 25 of the handset 20 and the polarized electret membrane, not shown, within an electret microphone 26. The handset 20 also includes an earphone receiver 24 within the receiver and portion 23. The receiver 24 is usually provided by a moving coil dynamic structure. These are structures which are materially unaffected if exposed to the ionizing radiation of the process. The receiver 24 and the microphone 26 are electrically connected via the telephone cord 29 to circuit elements within the base 10 for interfacing with the telephone line 17. While it is in the processing environment, the telephone set is connected via the telephone line 17 to receive energizing current from a controller 40 which also monitors voice band signals from the telephone. The controller 40 is also arranged to control operations of the X-ray source 50 via leads 51 and to control operation of loudspeaker 60 via leads 61 to generate acoustical energy, as depicted at 62.

In operation, the telephone set of a production population is placed in the processing environment where it is energized, in the OFF HOOK state, with operating current from the controller 40. The controller 40 obtains a measure of the gain characteristic of the transmit circuitry in the telephone set by operating the loudspeaker 60 to produce a predetermined sound pressure level whereby the electret microphone 26 is stimulated. As a result, an electrical voice band signal is received by the controller 40 from the telephone set via the telephone line 17. The electrical voice band signal is measured by the controller 40 to determine if it is at least of a required amplitude. If it is not, the process is terminated, and the telephone set is removed from the processing environment and segregated from the production population. Usually the electrical voice band signal is greater than the required amplitude. In this event, the process is continued by the controller 40 to cause the X-ray source 50 to emit ionizing radiation. The emission of the ionizing radiation causes the amplitude of the electrical voice band signal to be reduced. When a reduction to an amplitude which corresponds to the desired standard is achieved the process is terminated and the telephone set may be removed from the processing environment and be packaged in preparation for delivery to a customer.

If the telephone station set, as in this particular example, includes an additional electret microphone in the base 10, for providing a hands free feature, this microphone must be individually trimmed by repeating the process similar to that described, while the telephone station set is operated in a hands free mode. It does not matter whether the handset microphone or the hands free microphone is trimmed first or second, as long as the microphone which is not being measured by the controller 40 is also not being exposed to the ionizing radiation. Such may be achieved in various ways which will be apparent to persons skilled in the production processing art, and may include the simple expedient of shielding the base 10 with a lead blanket 70, while the handset 20 is in the process and visa versa. Of course in trimming the transmission characteristic of the hands free mode, the telephone set must have its hook switch 19 depressed, or apparently depressed, in order to achieve operation in the hands free mode.

Figure 3:
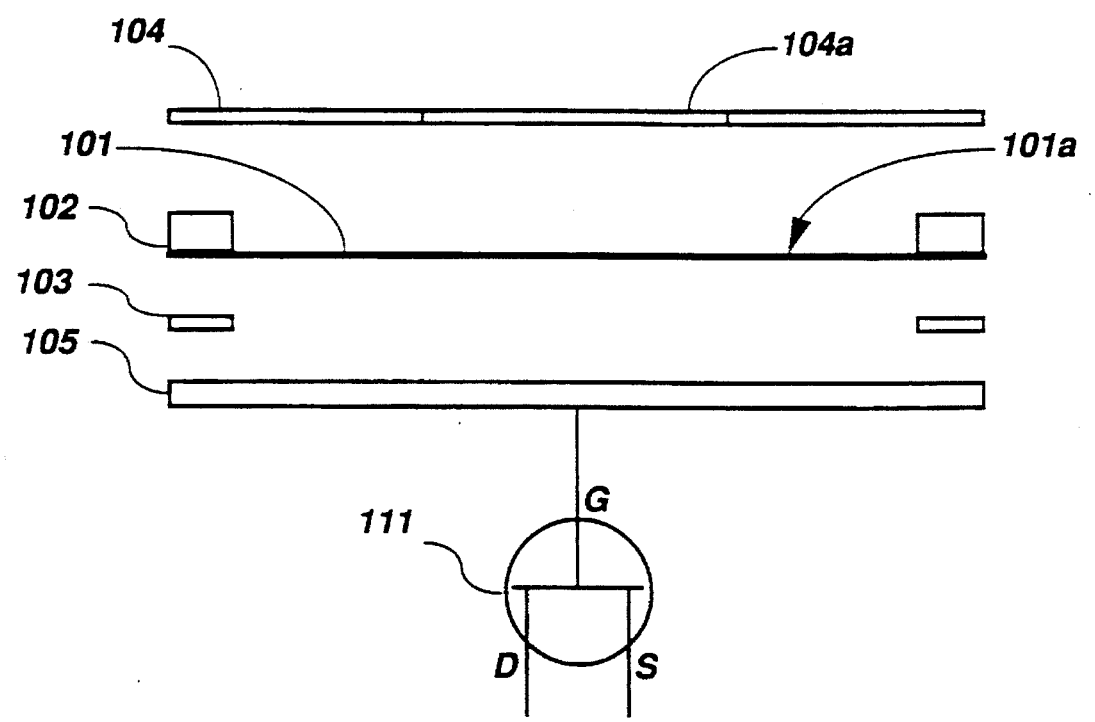
FIG. 3 is an exploded schematic diagram of an electret microphone as may be used in the telephone station set illustrated in FIG. 1.

Structural details as to actual assemblies of commercially available electret microphones are well known and hence the illustration in FIG. 3 is an exploded schematic diagram limited in detail as convenient for discussion of embodiments of the invention. A typical electret microphone, as illustrated in FIG. 3, includes an electret sheet material 101, which may be of a polarized TEFLON material coated on one side with a thin metallic layer 101a. The electret sheet material 101 is held in tension between electrically conductive and electrically insulating spacers 102 and 103. In assembly, the electret sheet material 101 and the spacers 102 and 103 are captured between an electrically conductive cover 104 and an electrically conductive back plate 105. The cover 104 includes at least one opening therein, as depicted at 104a, in order that the electret sheet material 101 is exposed to sound waves as such occur. The material of choice for providing the electrically conductive cover 104 and the electrically conductive back plate 105 has typically been aluminum. As aluminum is substantially transparent to X-rays, these elements are of no material consequence to the trimming process, when the X-ray source 50 is used. The back plate 105 is connected to a gate electrode G of a junction field effect transistor (JEFT) device 111, having source and drain electrodes S and D, which provides an impedance appropriate for operation with other circuitry, not shown, remote from the actual microphone structure.

During exposure to X-rays, it has been found that at least one known type of JEFT device exhibits a slightly enhanced gain characteristic which rapidly returns to normal immediately after exposure to the trimming radiation is ceased. It may therefore be advantageous to either compensate for any such variation during the process or perform the process as a series of time separated trimming and measuring steps, leading up to the preferred gain sensitivity for the microphone.

In at least one cost reduced electret microphone structure the conductive back plate 105 and the spacer 103 are provided in a single unitary structure of an ABS material which is carbon filled to provide an electrically resistive property of sufficient conductivity for electrically coupling with the gate electrode G. It has been found that with microphones of this particular structure, the immediate apparent effect of the trimming process is reduced and that the subsequent performance of the trimmed microphone may be unstable. While this effect was being explored it was found that the apparent reduction in trimming and the port trimming instability can be substantially mitigated if the temperature of the electret microphone is elevated above normal room temperature to between about 40° C. and 70° C. Therefore if an electret microphone is to be trimmed by X-ray radiation, it may be preferred that the trimming process be carried out at a temperature elevated above normal room temperature. For example, it was found to be beneficial when the X-ray trimming process was applied to an electret microphone with identification number EM-100PTNL, available from Primo, either separately or in an assembly including the microphone, that the process be performed at about 40° C., this being a temperature within a range in which a typical electronic apparatus is expected to perform normally.

Many variations of the process will be apparent in view of the preceding description and may be influenced by what is convenient for the particular forms in which the controller and the source of radiation are conveniently available or may be provided. Furthermore, variations of the process may be influenced by what is convenient for determining the amplitude of signals on the telephone line as these signals may be generated in the transmit circuits of either of analog or digital type telephone sets. For example in the process, the X-ray radiation and the amplitude measuring may be continuous until the desired transmission characteristic is achieved. In one alternative the radiation may be delivered sequentially in pulses alternated with the amplitude measurements. In other alternatives the radiation may be intensity modulated, or pulse width modulated, or both, with amplitude measurements being either interleaved or continuous. Furthermore, the process may also be advantageously optimized in a manufacturing process wherein the temperature of the environment is somewhat elevated above normal room temperature. In some instances it may be advantageous to combine the trimming process with a post assembly temperature stress procedure which is often typically used to accelerate failure prior to a final inspection of a manufacture assembly or apparatus.

What is claimed is:

1. In a manufacturing environment of an acoustical communication apparatus, having an electroacoustics circuit with an electret microphone, a post assembly process for adjusting a gain characteristic of the electroacoustics circuit, the post assembly process comprising the steps of:

a) energizing an individual one of the apparatus, in an OFF HOOK condition, via a communication line;

b) operating a source of sound to generate a predetermined sound pressure level at a predetermined frequency within an operating frequency range of the electroacoustics circuit;

c) via the communication line, determining sound amplitude of signals from the electret microphone;

d) comparing the amplitude determined in step c) with a value being representative of a predetermined minimum amplitude and, if the amplitude determined in step c) is in excess of said value;

e) operating a source of ionizing radiation to radiate at least a portion of the apparatus containing the electret microphone, until the sound amplitude is similar to the predetermined minimum amplitude, whereby the gain characteristic of the apparatus is adjusted.

2. The post assembly process defined as in claim 1 wherein the source of radiation is an X-ray source, the post assembly process comprising the further step of maintaining the apparatus, in an environment having an ambient temperature of at least 40° C. but not more than a temperature above which the apparatus is intended to be operable, prior to and during the performance of step e).

3. In a manufacturing environment of telephone terminal apparatus, each apparatus including a transmit circuit having an electret microphone, a post assembly process for adjusting a gain characteristic of the electret microphone, the process comprising the steps of:

a) energizing one of the telephone terminal apparatus, in an OFF HOOK condition, via a telephone line;

b) operating a source of sound to generate a predetermined sound pressure level at a predetermined frequency within an operating voice band of the transmit circuit;

c) via the telephone line, detecting an alternating current signal being of an amplitude in excess of a predetermined minimum amplitude, from the transmit circuit;

d) radiating at least a portion of the telephone terminal apparatus containing the electret microphone, from a source of ionizing radiation, until the detected amplitude of the alternating current signal is similar to the predetermined minimum amplitude, whereby the gain characteristic of the electret microphone in combination with the transmit circuit in each assembled telephone terminal apparatus corresponds to a required standard.

4. The process as defined in claim 3 wherein the assembled telephone terminal apparatus includes a handset transmit circuit having said electret microphone, the process being performed to adjust the gain characteristic of the handset transmit circuit.

5. The process as defined in claim 3 wherein the assembled telephone terminal apparatus includes a handset portion wherein said electret microphone is contained, and a base portion including an electret microphone, and wherein step d) is performed upon the handset portion to the exclusion of the base portion.

6. The process as defined in claim 3 wherein the assembled telephone terminal apparatus also includes a hands free transmit circuit having an electret microphone, and wherein while step d) is performed upon either one of the handset and hands free transmit circuits, and at least the electret microphone of the other of the handset and hands free transmit circuits is substantially excluded from exposure to the ionizing radiation.

7. The process as defined in claim 3, 4, 5, or 6 wherein the source of ionizing radiation is an X-ray source.

8. A process as defined in claim 7 wherein the processing environment is maintained at a temperature of at least 40° C. immediately prior to a performance of the post assembly process.

* * * * *